United States Patent
Hayashi (10) Patent No.: US 10,889,298 B2
(45) Date of Patent: Jan. 12, 2021

(54) VEHICLE CONTROL APPARATUS

(71) Applicant: DENSO CORPORATION, Kariya (JP)

(72) Inventor: Koji Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 16/315,281

(22) PCT Filed: Jun. 30, 2017

(86) PCT No.: PCT/JP2017/024264
§ 371 (c)(1),
(2) Date: Jan. 4, 2019

(87) PCT Pub. No.: WO2018/008565
PCT Pub. Date: Jan. 11, 2018

(65) Prior Publication Data
US 2019/0241184 A1  Aug. 8, 2019

(30) Foreign Application Priority Data
Jul. 7, 2016 (JP) .................................. 2016-135154

(51) Int. Cl.
*B60W 30/165* (2020.01)
*B60W 30/14* (2006.01)
(Continued)

(52) U.S. Cl.
CPC ........... *B60W 30/165* (2013.01); *B60K 31/00* (2013.01); *B60W 30/14* (2013.01); *G05D 1/0212* (2013.01);
(Continued)

(58) Field of Classification Search
CPC ........... B60K 2031/0025; B60K 31/00; B60W 2420/42; B60W 2420/52; B60W 2552/00;
(Continued)

(56) References Cited

U.S. PATENT DOCUMENTS 6,577,334 B1 * 6/2003 Kawai ................ B60G 17/0165
348/148
7,257,478 B2 * 8/2007 Sugano .................. B60W 10/06
701/96
(Continued)

FOREIGN PATENT DOCUMENTS

JP   H07-81455 A   3/1995
JP   H10-49672 A   2/1998
(Continued)

*Primary Examiner* — Tyler J Lee
(74) *Attorney, Agent, or Firm* — Maschoff Brennan (57) ABSTRACT

A detection ECU detects, from an image captured by an in-vehicle camera, left and right lane markings defining an own lane which is a traffic lane in which an own vehicle is traveling, and performs following travel control to cause the own vehicle to travel following a preceding vehicle which travels ahead in the own lane defined by the detected lane markings. Furthermore, when determining that the measured inter-vehicular distance is shorter than a predetermined distance and at least one of the detected lane markings has become undetectable during execution of the following travel control, the detection ECU determines based on the estimated and calculated lane markings that the preceding vehicle has deviated to a traffic lane different from the own lane.

6 Claims, 3 Drawing Sheets

(51) Int. Cl.
*B60K 31/00* (2006.01)
*G08G 1/16* (2006.01)
*G05D 1/02* (2020.01)
*G05D 3/00* (2006.01)

(52) U.S. Cl.
CPC .......... *G05D 1/0223* (2013.01); *G08G 1/167* (2013.01); *B60K 2031/0025* (2013.01); *B60W 2420/42* (2013.01); *B60W 2420/52* (2013.01); *B60W 2552/00* (2020.02); *B60W 2554/801* (2020.02); *B60W 2754/10* (2020.02); *B60W 2754/30* (2020.02); *G05D 1/0227* (2013.01); *G05D 3/00* (2013.01); *G05D 2201/02* (2013.01)

(58) Field of Classification Search
CPC . B60W 2554/4041; B60W 2554/4045; B60W 2554/801; B60W 2754/10; B60W 2754/30; B60W 30/14; B60W 30/12; B60W 30/165; B60W 30/182; G08G 1/167; G05D 1/0212; G05D 1/0223; G05D 1/0227; G05D 1/0244; G05D 3/00; G05D 2201/02
See application file for complete search history.

(56) References Cited

U.S. PATENT DOCUMENTS

| | | | | |
|---|---|---|---|---|
| 8,363,104 | B2 * | 1/2013 | Imai | G01C 21/3658 |
| | | | | 348/149 |
| 9,604,574 | B2 * | 3/2017 | Jo | B60W 30/18163 |
| 10,479,363 | B2 * | 11/2019 | Miyata | G08G 1/167 |
| 2005/0169501 | A1 * | 8/2005 | Fujii | G06K 9/00798 |
| | | | | 382/104 |
| 2006/0031008 | A1 * | 2/2006 | Kimura | G08G 1/096872 |
| | | | | 701/437 |
| 2011/0169958 | A1 | 7/2011 | Imai et al. | |
| 2015/0266508 | A1 * | 9/2015 | Yoshihata | B60W 30/12 |
| | | | | 701/41 |
| 2015/0332101 | A1 * | 11/2015 | Takaki | B60R 1/00 |
| | | | | 382/104 |
| 2016/0075280 | A1 * | 3/2016 | Shin | B60W 40/04 |
| | | | | 348/148 |
| 2016/0280229 | A1 * | 9/2016 | Kasahara | H04N 5/2354 |
| 2016/0339914 | A1 * | 11/2016 | Habu | B60W 30/12 |
| 2016/0349751 | A1 * | 12/2016 | Sugimoto | B60W 10/20 |
| 2016/0365068 | A1 * | 12/2016 | Sakaguchi | G09G 5/30 |
| 2017/0036601 | A1 * | 2/2017 | Kimura | B60R 1/00 |
| 2017/0067609 | A1 * | 3/2017 | Ichikawa | B60Q 1/0683 |
| 2017/0270381 | A1 * | 9/2017 | Itoh | B60S 1/0844 |
| 2017/0327123 | A1 | 11/2017 | Tokimasa et al. | |
| 2017/0330455 | A1 * | 11/2017 | Kikuchi | G06K 9/00798 |
| 2018/0031834 | A1 * | 2/2018 | Yamamura | G02B 27/0149 |
| 2018/0074497 | A1 * | 3/2018 | Tsuji | G08G 1/096888 |
| 2018/0170384 | A1 * | 6/2018 | Masui | G01S 13/86 |
| 2019/0143972 | A1 * | 5/2019 | Ishioka | G08G 1/167 |
| | | | | 701/70 |

FOREIGN PATENT DOCUMENTS

| | | |
|---|---|---|
| JP | H11-28948 A | 2/1999 |
| JP | 2003-223700 A | 8/2003 |
| JP | 4066573 B2 | 3/2008 |
| JP | 2010-158924 A | 7/2010 |
| JP | 2016-103223 A | 6/2016 |
| WO | 2010/035781 A | 4/2010 |

\* cited by examiner

VEHICLE CONTROL APPARATUS

CROSS REFERENCE TO RELATED APPLICATIONS

The present application is a national stage application of PCT Application No. PCT/JP2017/024264, filed Jun. 30, 2017, which claims the benefit of priority from earlier Japanese Patent Application No. 2016-135154, filed Jul. 7, 2016, the description of which is incorporated herein by reference.

TECHNICAL FIELD

The present disclosure relates to a vehicle control apparatus which controls following-travel of an own vehicle with respect to a preceding vehicle.

BACKGROUND ART

Conventionally, adaptive cruise control (ACC), traffic jam assist (TJA), and the like are implemented in which a preceding vehicle is selected from among other vehicles present around an own vehicle, ahead of the own vehicle in a travelling direction thereof, and the own vehicle is controlled to follow the preceding vehicle. In the ACC, in order to control the own vehicle to follow the selected preceding vehicle, acceleration and deceleration control is performed so that the distance between the own vehicle and the preceding vehicle is constant. Furthermore, when no preceding vehicle is present, control for maintaining the own vehicle at a constant speed is performed so that the own vehicle travels, for example, at the speed set by a driver or the speed limit on a road. In the TJA, a steering wheel is controlled so that the own vehicle travels on the road while following a preceding vehicle in a traffic jam.

Patent Literature (PTL) 1 discloses travel control in which a traffic lane in which the own vehicle is traveling is determined, a preceding vehicle present in the traffic lane is recognized as a target vehicle to be followed, and the target vehicle to be followed is followed. In the travel control disclosed in PTL 1, when white lines cannot be recognized due to the white lines being dirty, due to the white lines being hard to see in the night, or due to the lack of white lines, the traffic lane is recognized on the basis of a steering wheel angle and the speed of the own vehicle. Thus, the preceding vehicle in the traffic lane in which the own vehicle is traveling is specified as a preceding vehicle to be followed.

CITATION LIST

Patent Literature

[PTL 1] JP H07-081455 A

SUMMARY OF THE INVENTION

In PTL 1, in case that another vehicle suddenly cuts in front of the own vehicle, a laser radar detects a cutting-in vehicle. Furthermore, according to the disclosure of PTL 1, when the laser radar detects a cutting-in vehicle during the period of following travel control, the throttle of the own vehicle is fully closed, and the following travel control is performed after a predetermined length of time. However, there is no disclosure about how to control the own vehicle when an automatically followed vehicle moves to an adjacent traffic lane from the traffic lane in which the own vehicle is traveling. For example, when at least one of the white lines forming the traffic lane is a dashed line (hereinafter, referred to as a white dashed line), a white dashed line present ahead of the automatically followed vehicle may be unable to be recognized due to being blocked by the automatically followed vehicle depending on the inter-vehicular distance between the own vehicle and the automatically followed vehicle. At this time, if the automatically followed vehicle moves to an adjacent traffic lane on the side of a white dashed line that has failed to be recognized, the own vehicle may move to the adjacent traffic lane by following the automatically followed vehicle.

The present disclosure has been conceived to solve the aforementioned problem, and has a primary object to provide a vehicle control apparatus which, even when a lane marking present ahead of a preceding vehicle is blocked by the preceding vehicle and thus the lane marking becomes unable to be recognized, can determine that the preceding vehicle has deviated from the traffic lane in which the own vehicle is traveling to a different traffic lane.

The present disclosure relates to a vehicle control apparatus including: an in-vehicle camera which captures an image of an area located ahead of an own vehicle in a traveling direction thereof; a marking detection section which detects, from the image captured by the in-vehicle camera, left and right lane markings defining an own lane which is a traffic lane in which the own vehicle is traveling; a following travel section which causes the own vehicle to follow a preceding vehicle on a condition that a vehicle traveling ahead in the own lane has been determined as the preceding vehicle; an in-vehicle sensor which detects behavior of the own vehicle; an estimation and calculation section which estimates and calculates the lane markings from the behavior of the own vehicle detected by the in-vehicle sensor; a measurement section which measures an inter-vehicular distance between the own vehicle and the preceding vehicle; and a deviation determination section which, when determining that the inter-vehicular distance measured by the measurement section is shorter than a predetermined distance and at least one of the lane markings detected by the marking detection section has become undetectable during execution of following travel control by the following travel section to cause the own vehicle to travel following the preceding vehicle, determines based on the lane markings estimated and calculated by the estimation and calculation section that the preceding vehicle has deviated to a traffic lane different from the own lane.

When the inter-vehicular distance between the own vehicle and the preceding vehicle becomes shorter than the predetermined distance during traveling of the own vehicle in a traffic lane having white lines at least one of which is a dashed line, there is a case where a white dashed line present ahead of the preceding vehicle is blocked by the preceding vehicle and thus does not appear in an image captured by the in-vehicle camera. In this case, when the preceding vehicle moves to an adjacent traffic lane on the side of a white dashed line that has failed to be recognized, the own vehicle that has erroneously recognized the movement as movement in the own lane may move to the adjacent traffic lane by following the preceding vehicle.

As a measure for this, the estimation and calculation section is provided, and the lane marking that has become undetectable is estimated and calculated from the behavior of the own vehicle detected by the in-vehicle sensor. Thus, even if a lane marking defining the own lane becomes undetectable by the marking detection section, the lane marking that has become undetectable can be complemented, and accordingly the own lane can be recognized. Thus, when it is determined that the inter-vehicular distance to the preceding vehicle is shorter than the predetermined distance and at least one of the lane markings has become undetectable during execution of following travel control to cause the own vehicle to travel following the preceding vehicle, it can be determined based on the lane markings estimated and calculated by the estimation and calculation section that the preceding vehicle has deviated to a traffic lane different from the own lane. Accordingly, it is possible to prevent the occurrence of the own vehicle deviating from the own lane in which the own vehicle is currently traveling as a result of following the preceding vehicle that deviates to a traffic lane different from the own lane.

BRIEF DESCRIPTION OF THE DRAWINGS

These and other objects, features and advantages of the present disclosure will become more apparent from the following detailed description taken in conjunction with the accompanying drawings, in which.

DESCRIPTION OF THE EMBODIMENTS

Figure 1:
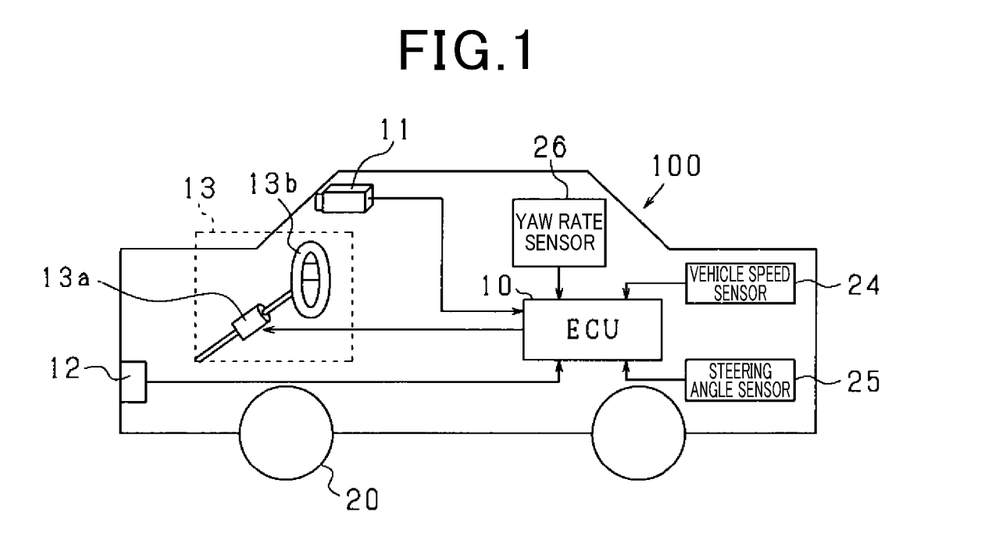
FIG. 1 is a schematic configuration diagram of a preceding vehicle following system according to the present embodiment.

With reference to FIG. 1, a preceding vehicle following system 100 applied to a vehicle that travels by rotation of drive wheels 20 will be described. The preceding vehicle following system 100 includes a detection ECU 10, an imaging device (corresponding to an in-vehicle camera) 11, a radar device 12, and electrically assisted power steering 13.

The imaging device 11 is, for example, a CCD camera, a CMOS image sensor, or a near-infrared camera. When attached to an own vehicle in a position at a predetermined height at the center in the vehicle width direction thereof, the imaging device 11 captures an image of a region spreading over a predetermined angle range in front of the own vehicle, and outputs information of the captured image to the detection ECU 10. Note that the imaging device 11 may be a single-lens camera or may be a stereo camera.

The radar device 12 is, for example, a known millimeter-wave radar which transmits a high-frequency signal in a millimeter-wave band as transmission waves. The radar device 12 is provided at a front end of the own vehicle, defines a region included in a predetermined angle as a sensing range in which an object can be sensed, and detects the location of an object present in the sensing range (referred to as a radar-detected object). Specifically, probe waves are transmitted at predetermined intervals, and reflected waves are received by a plurality of antennas. The distance to the radar-detected object is calculated using a point in time when the probe waves are transmitted and a point in time when the reflected waves are received. Furthermore, the relative speed of the radar-detected object with respect to the own vehicle is calculated using a change in the frequency of the waves reflected from the radar-detected object. In addition, the direction of the radar-detected object is calculated using a phase difference of the reflected waves received by the plurality of antennas. Note that if the location and the direction of the radar-detected object are successfully calculated, the relative location and the relative distance of that radar-detected object with respect to the own vehicle can be identified. At predetermined intervals, the radar device 12 transmits the probe waves, receives the reflected waves, calculates the relative location, the relative distance, and the relative speed, and transmits the calculated relative location, relative distance, and relative speed to the detection ECU 10.

Furthermore, various in-vehicle sensors are connected to the detection ECU 10, and the operating state of the engine, requests from a user, and the like are obtained on the basis of information received from the various in-vehicle sensors.

Specifically, the various in-vehicle sensors include a vehicle speed sensor 24 which detects the travel speed of the own vehicle, a steering angle sensor 25 which detects, as the steering angle of a steering wheel 13b to be described later, an angle at which the drive wheel 20 has been rotated, and a yaw rate sensor 26 which detects the yaw rate of the own vehicle.

The detection ECU 10 is a computer including a CPU, a RAM, a ROM, an I/O, and the like, and implements various functions by the CPU executing programs installed in the ROM. Thus, the detection ECU 10 corresponds to a radar-detected object location detection section, an image-detected object location detection section, a marking detection section, an estimation and calculation section, a measurement section, a deviation determination section, a ratio calculation section, and a cut-in determination section.

In the present embodiment, a plurality of programs are installed in the ROM and mainly include an identical object determination program, a white line detection program, an inter-vehicular distance obtainment program, and a following travel control program.

With the identical object determination program, the detection ECU 10 determines, on the basis of information on a radar-detected object and information on an image-detected object, whether or not objects are the identical.

Specifically, a radar-detected object location which is obtained from the radar-detected object and an image-detected object location which is a feature obtained from the image-detected object, which are close to each other, are associated with each other as the locations which are based on the identical object. When the image-detected object location is present close to the radar-detected object location (in the present embodiment, when the inter-object distance between the radar-detected object location and the image-detected object location falls within a predetermined range), the object is likely to be actually present at that radar-detected object location. This state in which the location of the object is accurately obtained using the radar device 12 and the imaging device 11 is referred to as a fusion state. In the present embodiment, on the condition that the radar-detected object and the image-detected object are determined as being in the fusion state, the presence of the preceding vehicle at the radar-detected object location is recognized.

With the white line detection program, the detection ECU 10 detects, from information on an image captured by the imaging device 11, a white line serving as a lane marking defining a traffic lane in which the own vehicle is traveling (hereinafter referred to as an own lane).

Specifically, on the basis of the luminance of the image captured by the imaging device 11, the detection ECU 10 extracts, as a candidate edge feature, a point of change in the contrast (edge strength) between a road surface and a white line defining the traffic lane. Furthermore, a candidate boundary line is extracted from a series of extracted candidate edge features. More specifically, the information on the image obtained from the imaging device 11 is continuously processed at predetermined sampling intervals, and a plurality of points at which the luminance abruptly changes in the horizontal direction of the image are extracted as candidate edge features. Furthermore, the Hough transform is performed on the plurality of the extracted candidate edge features so that a series of the candidate edge features are obtained, and a plurality of candidate lines having the series of the obtained candidate edge features as left and right outlines are extracted.

Furthermore, the degree of how many characteristics of a boundary line (white line) defining the traffic lane each of the plurality of candidate lines has at each of the candidate edge features is calculated, and a candidate line having the highest degree of characteristics is detected as a white line defining the traffic lane. Among the detected white lines, left and right white lines located close to the own vehicle and encompassing the own vehicle are recognized as white lines defining the own lane.

With the inter-vehicular distance obtainment program, the detection ECU 10 recognizes, as a target vehicle to be followed, a preceding vehicle present in the own lane (hereinafter referred to as an estimated own lane) estimated from the white lines detected using the white line detection program, among preceding vehicles determined using the identical object determination program. Furthermore, the radar device 12 obtains the relative distance of the target vehicle to be followed with respect to the own vehicle. Hereinafter, the relative distance of the target vehicle to be followed with respect to the own vehicle will be referred to as an inter-vehicular distance between the own vehicle and the preceding vehicle.

With the following travel control program, on the condition that the target vehicle to be followed has been recognized in the estimated own lane, the detection ECU 10 performs a steering process of controlling the traveling direction of the own vehicle in order to cause the own vehicle to travel following the target vehicle to be followed. The own vehicle includes the electrically assisted power steering 13 as a safety device which is driven according to a steering command from the detection ECU 10. The detection ECU 10 and the electrically assisted power steering 13 correspond to a following travel section.

The electrically assisted power steering 13 includes the steering wheel 13b which controls the steering angle of the drive wheel 20 of the vehicle, and an electric motor 13a for steering. The electric motor 13a for steering generates steering force (torque) for assisting the operation force of the steering wheel 13b. As this torque increases, the steering angle of the drive wheel 20 increases. Furthermore, the electric motor 13a for steering generates steering force (torque) for operating the steering wheel 13b at the time of the following travel control.

With the following travel control program, the detection ECU 10 transmits a control command to the engine and the brake device, which are not shown in the drawings, in order to maintain, at a target value, the inter-vehicular distance between the own vehicle and the target vehicle to be followed, which is obtained using the inter-vehicular distance obtainment program, during a time period in which the own vehicle is controlled to travel following the target vehicle to be followed. The target value changes according to the travel speed of the own vehicle.

Figure 2:
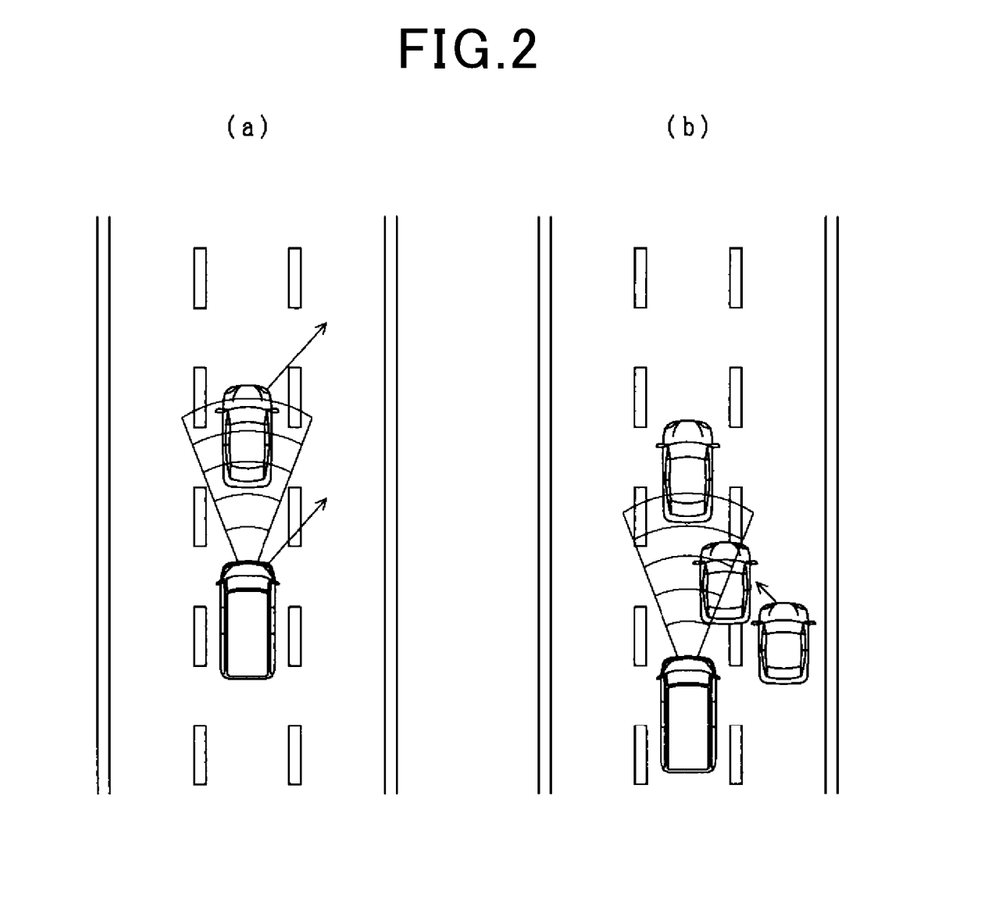
FIG. 2 is a diagram showing a situation in which an own vehicle becomes unable to detect a white line forming an own lane during following travel control.

A case is assumed in which, as illustrated in FIG. 2(a), the own vehicle is traveling in a traffic lane having dashed lines (hereinafter referred to as white dashed lines) as left and right white lines forming the traffic lane, and the detection ECU 10 performs the following travel control using the following travel control program. In this case, in the state where the inter-vehicular distance between the own vehicle and the target vehicle to be followed is shorter than a predetermined distance, a white dashed line present ahead of the target vehicle to be followed in the travelling direction thereof may be unable to be recognized due to being blocked by the target vehicle to be followed. If the target vehicle to be followed moves to an adjacent traffic lane on the side of a white dashed line that has failed to be recognized, the own vehicle may move to the adjacent traffic lane by following the target vehicle to be followed.

There is also a situation in which, as illustrated in FIG. 2(b), a cutting-in vehicle, which travels in an adjacent traffic lane, cuts in between the own vehicle and the target vehicle to be followed and thus a white dashed line present ahead of the cutting-in vehicle in the traveling direction is blocked by the cutting-in vehicle. In such a situation, the own vehicle may recognize, as a target vehicle to be followed that travels in the own lane, a cutting-in vehicle which moves from the adjacent traffic lane into the own lane. In this case, when the own vehicle is controlled to travel following the traveling of the cutting-in vehicle that is cutting in, the own vehicle may exhibit unstable behavior.

In the present embodiment, the ROM further includes an estimation and calculation program, a deviation determination program, and a cut-in determination section.

With the estimation and calculation program, the detection ECU 10 determines whether or not the inter-vehicular distance between the own vehicle and the target vehicle to be followed, which is obtained using the inter-vehicular distance obtainment program, is shorter than the predetermined distance, and at least one of the white lines defining the own lane, which are detected using the white line detection program, has become undetectable. Subsequently, when the result of this determination is affirmative, the white line defining the own lane is estimated and calculated on the basis of the information received from the various in-vehicle sensors and the white lines defining the own lane that have been detected so far using the white line detection program.

Figure 3:
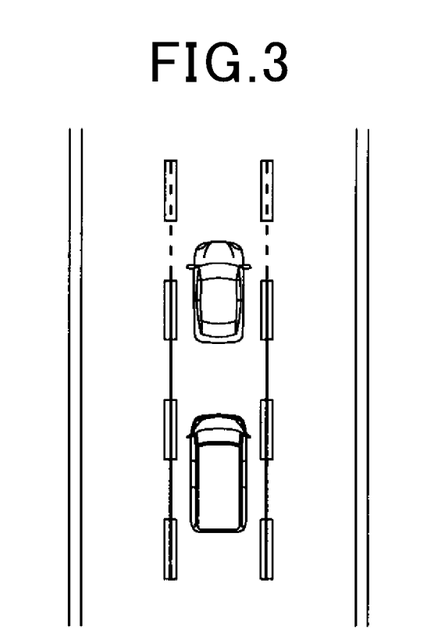
FIG. 3 is a diagram showing a method for estimating a white line forming an own lane that has become undetectable.

Specifically, when the steering angle of the steering wheel 13b is approximately 0, the detection ECU 10 assumes that the own vehicle is traveling straight, estimates the white lines defining the own lane as being linear, and, as illustrated in FIG. 3, linearly extends the white lines that have been detected so far. In contrast, when the steering angle of the steering wheel 13b is not approximately 0, the own lane is estimated as a curved road. In this case, according to a vehicle motion equation, a track of the own vehicle can be calculated on the basis of the steering angle of the steering wheel 13b detected by the steering angle sensor 25, the travel speed of the own vehicle detected by the vehicle speed sensor 24, and a slip angle formed between the angular orientation of the drive wheel 20 and the traveling direction of the own vehicle. Furthermore, on the basis of the calculated track of the own vehicle, a track of the white lines defining the own lane is estimated, and the white lines that have been detected so far are extended along the estimated track. Note that although the slip angle can be estimated on the basis of the yaw rate of the own vehicle detected by the yaw rate sensor 26, since this estimation method is well-known, detailed description thereof will be omitted. Since the method for calculating a track of the own vehicle is also well known, detailed description thereof will be omitted.

With the deviation determination program, when determining that the obtained inter-vehicular distance between the own vehicle and the target vehicle to be followed is shorter than the predetermined distance and at least one of the white lines defining the own lane has become undetectable during execution of the following travel control, the detection ECU 10 determines whether or not the target vehicle to be followed has deviated to a traffic lane different from the own lane.

When the target vehicle to be followed crosses significantly over the white line forming the own lane during traveling, it is highly likely that the target vehicle to be followed is intentionally deviating from the own lane to an adjacent traffic lane. Therefore, in the present embodiment, when the ratio of the width of the target vehicle to be followed beyond the white line calculated by the detection ECU 10 though execution of the estimation and calculation program (hereinafter referred to as an estimated white line), with respect to the width of the target vehicle to be followed, exceeds a predetermined value (for example, 50%), the target vehicle to be followed is determined as having deviated to a traffic lane different from the own lane.

When the target vehicle to be followed is determined as having deviated to a traffic lane different from the own lane, the detection ECU 10 ends the following travel control related to that target vehicle to be followed.

With the cut-in determination program, when it is determined that the obtained inter-vehicular distance between the own vehicle and the target vehicle to be followed is shorter than the predetermined distance and at least one of the detected white lines defining the own lane has become undetectable during execution of the following travel control, the detection ECU 10 determines whether or not a cutting-in vehicle has cut in between the target vehicle to be followed and the own vehicle.

Specifically, when the ratio of the width of a cutting-in vehicle that travels in a traffic lane adjacent to the own lane, beyond the estimated white line, with respect to the width of the cutting-in vehicle, exceeds a predetermined value, it is determined that the cutting-in vehicle has cut in between the own vehicle and the target vehicle to be followed.

When determining that the cutting-in vehicle has cut in between the own vehicle and the target vehicle to be followed, the detection ECU 10 keeps the inter-vehicular distance between the own vehicle and the target vehicle to be followed long, by re-setting a target value to a greater value than that when it is determined that no cutting-in vehicle has cut in between the own vehicle and the target vehicle to be followed. Subsequently, after the cutting-in vehicle is included in the own lane estimated according to the estimated white line, the detection ECU 10 changes the following control subject to the cutting-in vehicle (changes the target vehicle to be followed to the cutting-in vehicle), and continues the following travel control.

Figure 4:
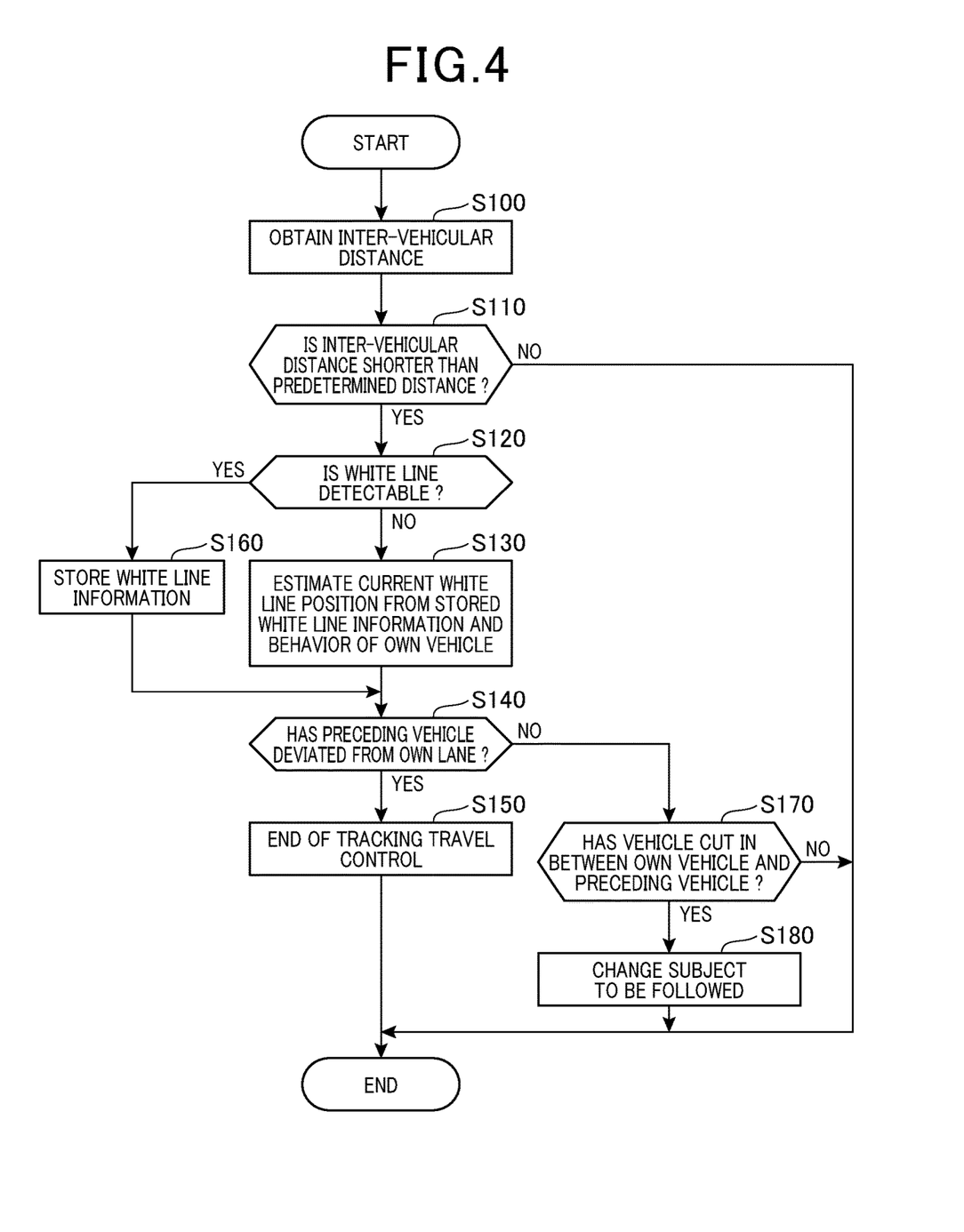
FIG. 4 is a flowchart of control performed by a detection ECU according to the present embodiment.

In the present embodiment, the detection ECU 10 performs the deviation and cut-in determination control illustrated in FIG. 4 to be described later. During execution of the following travel control using the following travel control program, the detection ECU 10 repeatedly performs, at predetermined intervals, the deviation and cut-in determination control shown in FIG. 4.

First, in Step S100, the inter-vehicular distance between the own vehicle and the target vehicle to be followed is obtained from the radar device 12. In Step S110, whether or not the inter-vehicular distance between the own vehicle and the target vehicle to be followed, which has been obtained in Step S100, is shorter than a predetermined distance is determined. If it is determined that the inter-vehicular distance between the own vehicle and the target vehicle to be followed is not shorter than the predetermined distance (S110: NO), the present control ends. If it is determined that the inter-vehicular distance between the own vehicle and the target vehicle to be followed is shorter (S110: YES), the processing proceeds to Step S120.

In Step S120, whether or not the left and right white lines defining the own lane have been successfully detected from information of an image captured by the imaging device 11 is determined. If it is determined that the left and right white lines defining the own lane have been successfully detected from the information of the image captured by the imaging device 11 (S120: YES), the processing proceeds to Step S160, and the detected left and right white lines defining the own lane are stored. Subsequently, the processing proceeds to Step S140 to be described later. If it is determined that the left and right white lines defining the own lane have not been successfully detected from the information of the image captured by the imaging device 11 (S120: NO), the processing proceeds to Step S130. In Step S130, a track of the white line defining the own lane is estimated and calculated on the basis of the left and right white lines defining the own lane that have been stored in Step S160 and information received from the various in-vehicle sensors.

In Step S140, if the result of the determination in the process in Step S120 is YES, whether or not the target vehicle to be followed has deviated to a traffic lane different from the own lane is determined according to the left and right white lines defining the own lane that have been stored in Step S160. Alternatively, if the result of the determination in the process in Step S120 is NO, whether or not the target vehicle to be followed has deviated to a different traffic lane from the own lane is determined based on the estimated white line calculated in Step S130. If it is determined that the target vehicle to be followed has deviated to a different traffic lane from the own lane (S140: YES), the processing proceeds to Step S150, and the following travel control related to that target vehicle to be followed ends. Thus, the present control ends. If it is determined that the target vehicle to be followed has not deviated to a different traffic lane from the own lane (S140: NO), the processing proceeds to Step S170.

In Step S170, whether or not a vehicle has cut in between the own vehicle and the target vehicle to be followed is determined. If it is determined that a cutting-in vehicle has cut in between the own vehicle and the target vehicle to be followed (S170: YES), the processing proceeds to Step S180. In Step S180, the target value is re-set to a greater value than that when it is determined that no cutting-in vehicle has cut in between the own vehicle and the target vehicle to be followed. Subsequently, after the cutting-in vehicle is included in the own lane estimated according to the estimated white line, the following control subject is changed to the cutting-in vehicle, and the present control ends. If it is determined that no vehicle has cut in between the own vehicle and the target vehicle to be followed (S170: NO), the present control ends.

With the above-described configuration, the present embodiment provides the following advantageous effects.

On the basis of the information received from the various in-vehicle sensors and the information on the white lines defining the own lane that have been detected so far using the white line detection program, the white line defining the own lane is estimated and calculated using the estimation and calculation program. Thus, even if a lane marking defining the own lane becomes undetectable using the white line detection program, the white line that has become undetectable can be complemented, and accordingly the own lane can be recognized.

Thus, with the deviation determination program, when determining that the inter-vehicular distance to the target vehicle to be followed which is obtained using the inter-vehicular distance obtainment program is shorter than the predetermined distance and at least one of the lane markings detected using the white line detection program has become undetectable during execution of the following travel control using the following travel control program, the detection ECU 10 can determine, based on the lane markings estimated and calculated using the estimation and calculation program, that the target vehicle to be followed has deviated to a different traffic lane from the own lane. Accordingly, it is possible to prevent the occurrence of the own vehicle deviating from the own lane in which the own vehicle is currently traveling as a result of following the target vehicle to be followed that deviates to a different traffic lane from the own lane.

With the deviation determination program, when the ratio of the width of the vehicle to be followed beyond the estimated white line calculated using the estimation and calculation program exceeds the predetermined value, the detection ECU 10 can determine that the vehicle to be followed has deviated to a traffic lane different from the own lane.

With the cut-in determination program, even if a vehicle cuts in between the target vehicle to be followed and the own vehicle during execution of the following travel control using the following travel control program, it can be determined, based on an estimated white line which is a white line estimated and calculated using the estimation and calculation program, that the cutting-in vehicle has cut in between the target vehicle to be followed and the own vehicle. Furthermore, the cutting-in vehicle can be prevented from being recognized as the target vehicle to be followed until the cutting-in vehicle is in the own lane estimated according to the estimated white line, and thus it is possible to prevent the occurrence of the own vehicle traveling following the traveling of the cutting-in vehicle that is cutting in.

When the cut-in determination section determines that the cutting-in vehicle has cut in between the own vehicle and the target vehicle to be followed, the inter-vehicular distance between the own vehicle and the target vehicle to be followed is kept long by re-setting the target value to a greater value than that when it is determined that no cutting-in vehicle has cut in between the own vehicle and the target vehicle to be followed. Accordingly, when the cutting-in vehicle cuts in between the own vehicle and the target vehicle to be followed, the inter-vehicular distance between the own vehicle and the cutting-in vehicle can be set sufficiently long, and thus the safety during traveling can be ensured.

A preceding vehicle is detected on the condition that the positional relationship between the radar-detected object and the image-detected object, which are present ahead of the own vehicle, has become a predetermined relationship. Thus, the relative position of the detected preceding vehicle with respect to the own vehicle is accurate, and accordingly the own vehicle can be controlled to travel precisely following the target vehicle to be followed.

The above-described embodiment can be modified and implemented as below.

In the above-described embodiment, the fusion state is determined using the radar device 12 and the imaging device 11. Regarding this, the fusion state does not necessarily need to be determined for performing the present deviation and cut-in determination control. For example, the preceding vehicle following system 100 including the imaging device 11, but not including the radar device 12, may perform the present deviation and cut-in determination control. In this case, the inter-vehicular distance between the own vehicle and the target vehicle to be followed is calculated on the basis of information of an image captured by the imaging device 11.

In the above-described embodiment, during execution of the following travel control using the following travel control program, the detection ECU 10 performs the deviation and cut-in determination control at predetermined intervals. Regarding this, the deviation and cut-in determination control may be performed during execution of the following travel control using the following travel control program when the target value is set less than a predetermined distance. In this case, the time period during which the deviation and cut-in determination control is performed can be further limited. In addition, since the target value is set less than the predetermined distance, the following travel control is performed such that during traveling, the own vehicle remains in the state where the inter-vehicular distance between the own vehicle and the target vehicle to be followed is less than the predetermined distance, and thus determination of whether or not the inter-vehicular distance between the own vehicle and the target vehicle to be followed which has been detected by the radar device 12 is shorter than the predetermined distance can be omitted. Specifically, the determination processes in Steps S100 and S110 illustrated in the flowchart in FIG. 4 can be omitted. Thus, the deviation and cut-in determination control can be facilitated.

Another example of the deviation determination for the target vehicle to be followed deviating to a traffic lane different from the own lane will be described.

[1] When the target vehicle to be followed intentionally deviates from the own lane to an adjacent traffic lane, the lateral speed of the target vehicle to be followed that is moving to the targeted traffic lane is expected to be high. Therefore, on the basis of an image captured by the imaging device 11, the lateral speed at which the target vehicle to be followed approaches the estimated white line may be calculated, and when the calculated lateral speed of the target vehicle to be followed is greater than a predetermined speed, the target vehicle to be followed may be determined as having deviated from the own lane.

[2] When the target vehicle to be followed intentionally deviates from the own lane to an adjacent traffic lane, not only the lateral speed but also the lateral acceleration, of the target vehicle to be followed that is moving to the targeted traffic lane is expected to be high. Therefore, on the basis of an image captured by the imaging device 11, the lateral acceleration at which the target vehicle to be followed approaches the estimated white line may be calculated, and when the calculated lateral acceleration of the target vehicle to be followed is greater than predetermined acceleration, the target vehicle to be followed may be determined as having deviated from the own lane.

The above-described embodiment and the deviation determination described in [1] and [2] do not need to be implemented independently of each other and may be arbitrarily combined when implemented. In this case, the accuracy of the deviation determination can be improved.

The present disclosure has been described in accordance with the embodiment, but the present disclosure should in no way be construed as being limited to the embodiment, the configuration, and the like. The present disclosure encompasses various variations and modifications made within the range of equivalence. In addition, various combinations and forms, and furthermore, other combinations and forms including only one element of these and elements no less than or no more than these are also included in the scope and the concept of the present disclosure.

The invention claimed is:

1. A vehicle control apparatus comprising:
   an in-vehicle camera which captures an image of an area located ahead of an own vehicle in a traveling direction thereof;
   a marking detection section which detects, from the image captured by the in-vehicle camera, left and right lane markings defining an own lane which is a traffic lane in which the own vehicle is traveling;
   a following travel section which causes the own vehicle to follow a preceding vehicle on a condition that a vehicle traveling ahead in the own lane has been determined as the preceding vehicle based on the lane markings detected by the marking detection section;
   an in-vehicle sensor which detects behavior of the own vehicle;
   an estimation and calculation section which estimates and calculates the lane markings from the behavior of the own vehicle detected by the in-vehicle sensor;
   a measurement section which measures an inter-vehicular distance between the own vehicle and the preceding vehicle; and
   a deviation determination section which, during execution of following travel control by the following travel section to cause the own vehicle to travel following the preceding vehicle, (i) when determining that the inter-vehicular distance measured by the measurement section is longer than a predetermined distance indicating a distance by which the lane marking present ahead of the preceding vehicle is blocked by the preceding vehicle, causes the following travel section to continue the execution of the following travel control, (ii) when determining that the inter-vehicular distance is shorter than the predetermined distance and at least one of the lane markings detected by the marking detection section has become undetectable, determines based on the lane markings estimated and calculated by the estimation and calculation section that whether or not the preceding vehicle has deviated to a traffic lane different from the own lane, and (iii) when determining that the inter-vehicular distance is shorter than the predetermined distance and the lane markings on both sides are detectable by the marking detection section, determines based on the left and right lane markings detected by the marking detection section whether or not the preceding vehicle has deviated to a traffic lane different from the own lane, wherein
   when the deviation determination section determines, during the execution of the following travel control, that the preceding vehicle has deviated to a traffic lane different from the own lane, the following travel section ends the following travel control.

2. The vehicle control apparatus according to claim 1, further comprising a ratio calculation section which calculates a ratio of a width of the preceding vehicle beyond the lane markings estimated and calculated by the estimation and calculation section, with respect to a width of the preceding vehicle, wherein
   when the ratio calculated by the ratio calculation section exceeds a predetermined value, the deviation determination section determines that the preceding vehicle has deviated to a traffic lane different from the own lane.

3. The vehicle control apparatus according to claim 1, further comprising a lateral speed calculation section which calculates a lateral speed at which the preceding vehicle approaches the lane markings estimated and calculated by the estimation and calculation section, wherein
   when the lateral speed calculated by the lateral speed calculation section exceeds a predetermined speed, the deviation determination section determines that the preceding vehicle has deviated to a traffic lane different from the own lane.

4. The vehicle control apparatus according to claim 1, further comprising a lateral acceleration calculation section which calculates lateral acceleration at which the preceding vehicle approaches the lane markings estimated and calculated by the estimation and calculation section, wherein
   when the lateral acceleration calculated by the lateral acceleration calculation section exceeds predetermined acceleration, the deviation determination section determines that the preceding vehicle has deviated to a traffic lane different from the own lane.

5. The vehicle control apparatus according to claim 1, further comprising
   a cut-in determination section which, when determining that the inter-vehicular distance measured by the measurement section is shorter than a predetermined distance and at least one of the lane markings detected by the marking detection section has become undetectable during execution of the following travel control by the following travel section, determines based on the lane markings estimated and calculated by the estimation and calculation section that a vehicle has cut in between the preceding vehicle and the own vehicle.

6. The vehicle control apparatus according to claim 1, further comprising:
   a radar device which transmits probe waves forward in a traveling direction of a vehicle and receives reflected waves which are waves reflected by an object;
   a radar-detected object location detection section which detects a location of a radar-detected object detected according to information based on the reflected waves obtained from the radar device; and
   an image-detected object location detection section which detects a location of an image-detected object detected according to the image obtained from the in-vehicle camera, wherein
   the vehicle control apparatus detects the preceding vehicle on a condition that a positional relationship between the radar-detected object and the image-detected object which are present ahead of the own vehicle has become a predetermined relationship.

* * * * *